(No Model.) 2 Sheets—Sheet 1.
H. S. MAXIM.
ART OF AND APPARATUS FOR CUTTING OR DIVIDING STONE.
No. 247,569. Patented Sept. 27, 1881.
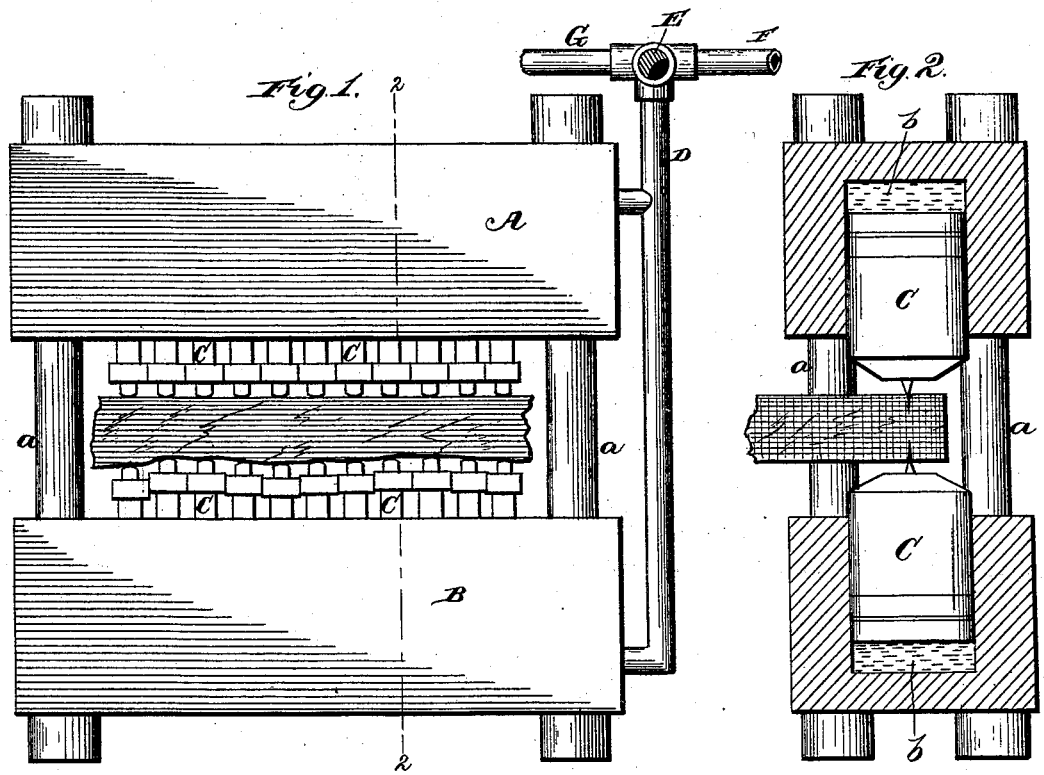
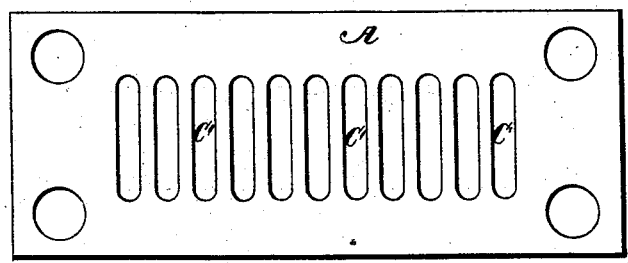
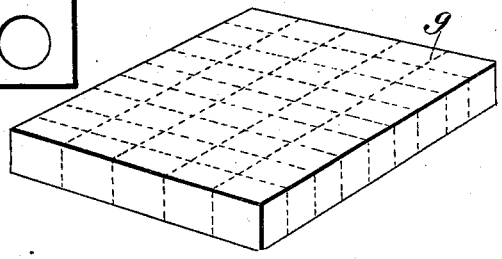
Witnesses,
Rbht Everett
E. A. Dick
Inventor:
Hiram S. Maxim
By Parker W. Page.
Atty.

(No Model.) 2 Sheets—Sheet 2.
H. S. MAXIM.
ART OF AND APPARATUS FOR CUTTING OR DIVIDING STONE.

No. 247,569. Patented Sept. 27, 1881.

Witnesses.
Robert Everett,
E. J. Dick

Inventor:
Hiram S. Maxim
By Parker W. Page
Atty

UNITED STATES PATENT OFFICE.

HIRAM S. MAXIM, OF BROOKLYN, NEW YORK.

ART OF AND APPARATUS FOR CUTTING OR DIVIDING STONE.

SPECIFICATION forming part of Letters Patent No. 247,569, dated September 27, 1881.

Application filed August 10, 1881. (No model.)

*To all whom it may concern:*

Be it known that I, HIRAM S. MAXIM, of Brooklyn, in the county of Kings and State of New York, have invented certain new and useful Improvements in the Art of and Apparatus for Cutting or Dividing Stone, of which the following is a specification.

My invention is designed particularly with a view to the manufacture of stone paving-blocks. It is, however, adapted to be used generally for stone cutting or dividing purposes.

It consists in a method of dividing a slab or block of stone into smaller pieces of desired shape by simultaneous pressure along determined lines of chisel-like instruments upon opposite faces of the stone.

The mechanism or apparatus which I prefer to employ in practicing this method consists of oppositely-placed rows or sets of pistons, preferably hydraulic pistons, which receive between them the stone to be divided, and are armed with cutting edges or points which bear upon the stone along the line of division. These pistons are independent of one another, and are actuated from a common source in such manner that the motor-fluid, whatever it may be, will drive all the pistons up home against the irregular surface or surfaces of the stone before any one of them begins to exert a cutting or dividing pressure; but so soon as they are in place against the stone their simultaneous pressure will be exerted by all of them equally against opposite faces of the stone. I find in practice that a pressure of three thousand pounds per square inch is sufficient for ordinary purposes, and it is manifest that this pressure can readily be obtained by the use of many well-known forms of hydraulic-pressure apparatus.

The nature of my invention and the manner in which the same is or may be carried into effect are illustrated in the accompanying drawings, in which—

Figure 5:
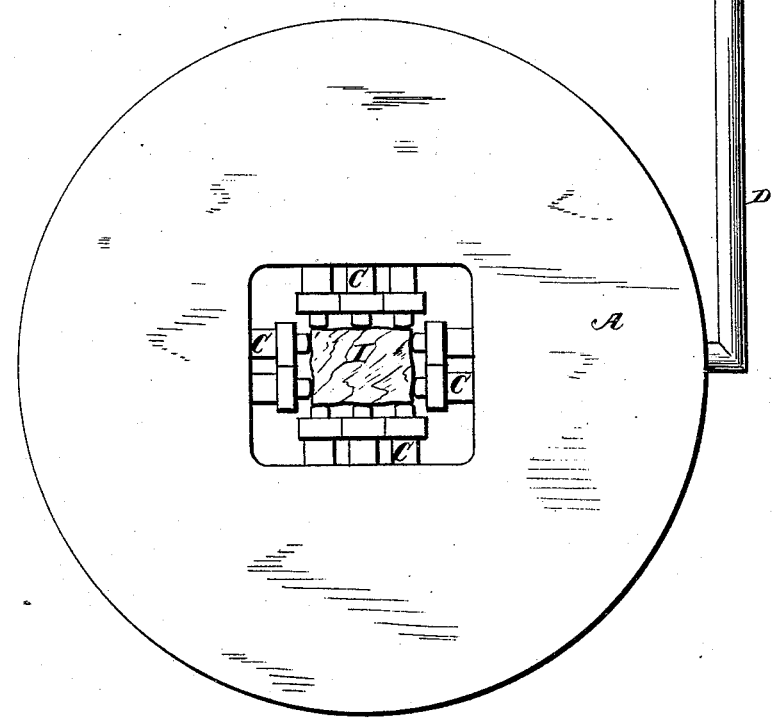
Figure 6:
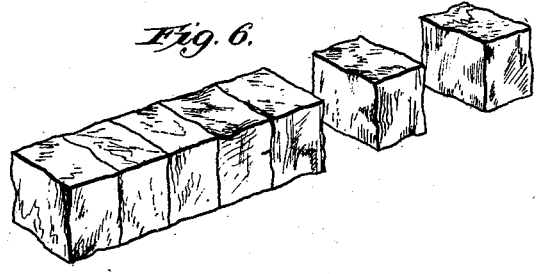

Figure 1 is an elevation of the preferred form of apparatus employed by me. Fig. 2 is a section of the same on line 2 2, Fig. 1. Fig. 3 is a plan of one of the piston-holding chambers. Fig. 4 represents the stone slab or block to be cut up into small strips or blocks, as indicated by dotted lines. Fig. 5 is an elevation of a modified form of apparatus intended to cut up the strips or long narrow blocks produced by the apparatus shown in Fig. 1 into blocks of a size adapted for paving purposes, as indicated in Fig. 6.

A and B are two chambered metallic blocks, capable of withstanding great internal pressure. They are placed one over the other at a proper distance apart, and are held in this position by strong tie rods or bolts *a*. The pieces A B contain each a number of pistons or plungers, C, which project toward one another from the interior opposite faces of said pieces, and are armed with chisel or cutting points *c*. Each plunger has its own receptacle in which it can move back and forth, and it is, of course, provided with a suitable packing to prevent leakage. The plungers are made oblong in cross-section, as indicated in Fig. 3, which represents the shape of the plunger-receptacle C', this being for the purpose of retaining sufficient sectional area for strength and the requisite pressure, and at the same time of putting the plungers in such form that they may be used in considerable number and close together. In each block or chamber all the piston-receptacles open at the rear into a common supply-duct, *b*, through which the motor-fluid is forced against the ends of the plungers, and both chambers are connected to a hydraulic-pressure apparatus (which I have not deemed it necessary to show) by means of a pipe, D. This pipe is provided with a cock or valve, E, which is arranged to throw the pipe D into communication with either the pipe F or the pipe G, as desired. Pipe F leads to the hydraulic-pressure apparatus, and pipe G leads to an exhaust apparatus which is used to withdraw the pistons or plungers after they have done their work.

The operation of the apparatus thus far described is as follows: The slab or block shown in Fig. 4 is by suitable means brought between the two rows of chisel-pointed plungers in such position that the latter will be opposite the line (*e. g.*, one of the dotted lines shown in Fig. 4) along which the stone is to be divided. Cock or valve E is then moved so as to bring the pipes D and F into communication. When this is done the hydraulic-pressure apparatus, forcing the fluid through pipe D, and thence through ducts *b*, causes the plungers to be driven up against the irregular surfaces of the stone by a pressure, first, of about one hundred pounds. The pistons or plungers being independent of one another, no splitting or dividing pressure will be exerted by them until they are all tight against the stone. As soon as this takes place the pressure is increased to about three thousand pounds, when they all simultaneously press with their chisel or cutting points into the surface of the stone with the effect of separating from the main body of the stone a strip or piece, which is afterward divided crosswise into a number of blocks suitable for paving, as indicated in Fig. 6.

The apparatus for dividing the strip into paving-blocks is shown in Fig. 5. It is the same in principle and in its general arrangement and mode of operation as the apparatus shown in Fig. 1, the only difference being that in the apparatus shown in Fig. 5 there are four sets of chisel-pointed plungers, C, instead of only two sets, as in Fig. 1. These four sets act on all four sides of the stone inserted in the space between them, as indicated in Fig. 5, where the stone is represented at I, and in this way the long strips formed by the first apparatus are by cross-cuts divided up into blocks, as shown in Fig. 6.

The apparatus described is economical, effective, and easily operated. I do not, however, restrict myself to the details herein shown, inasmuch as the same may be greatly varied without departure from the principle of my invention; but

What I claim, and desire to secure by Letters Patent, is—

1. The improvement in the art of cutting or dividing stone which consists in subjecting said stone to the simultaneous pressure of gangs or rows of chisel-pointed instruments applied to the stone along predetermined lines on opposite faces or sides of the same, substantially as and for the purposes hereinbefore set forth.

2. In apparatus for splitting or dividing stone, the combination of piston-receiving chambers communicating with a common source of power and oppositely-placed rows or gangs of chisel-pointed or equivalently-formed independent pistons or plungers carried by and in said chambers adapted to receive between them the stone to be divided and arranged and operated to act thereon, substantially as and for the purposes herein set forth.

3. The combination of the piston-receiving chambers, the chisel-pointed or equivalently-formed independent pistons or plungers mounted therein, and cock or valve controlled pipes or ducts by which said chambers may be thrown into communication with pressure-producing or exhaust apparatus at will, substantially as hereinbefore set forth.

In testimony whereof I have hereunto set my hand this 30th day of July, 1881.

HIRAM S. MAXIM.

Witnesses:
PARKER W. PAGE,
CLAYTON KNEELAND.